(12) United States Patent
Wengelnik et al.

(10) Patent No.: US 10,755,674 B2
(45) Date of Patent: Aug. 25, 2020

(54) ARRANGEMENT, MEANS OF LOCOMOTION AND METHOD FOR ASSISTING A USER IN THE OPERATION OF A TOUCH-SENSITIVE DISPLAY DEVICE

(71) Applicant: VOLKSWAGEN AKTIENGESELLSCHAFT, Wolfsburg (DE)

(72) Inventors: Heino Wengelnik, Wolfsburg (DE); Hans Gerd Hoyer, Hamburg (DE); Spiro Trikaliotis, Oebisfelde-Weferlingen (DE); Maria Esther Mejia Gonzalez, Redwood City, CA (US); Christoph Wojzischke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 108 days.

(21) Appl. No.: 15/998,893

(22) PCT Filed: Jan. 9, 2017

(86) PCT No.: PCT/EP2017/050354
§ 371 (c)(1),
(2) Date: Aug. 15, 2018

(87) PCT Pub. No.: WO2017/140437
PCT Pub. Date: Aug. 24, 2017

(65) Prior Publication Data
US 2020/0098340 A1    Mar. 26, 2020

(30) Foreign Application Priority Data
Feb. 15, 2016    (DE) ..................... 10 2016 202 2512

(51) Int. Cl.
*G09G 5/37* (2006.01)
*B60Q 3/85* (2017.01)
(Continued)

(52) U.S. Cl.
CPC ............. *G09G 5/37* (2013.01); *B60H 1/0065* (2013.01); *B60K 37/06* (2013.01); *B60Q 3/85* (2017.02);
(Continued)

(58) Field of Classification Search
None
See application file for complete search history.

(56) References Cited

U.S. PATENT DOCUMENTS

| 2003/0023352 A1 | 1/2003 | Ogino et al. |
| 2008/0192024 A1 | 8/2008 | Mita |

(Continued)

FOREIGN PATENT DOCUMENTS

| DE | 102007011542 A1 | 3/2008 |
| DE | 102007034272 A1 | 1/2009 |

(Continued)

OTHER PUBLICATIONS

PCT International Application No. 2017/EP2017/050354. International Search Report (dated May 9, 2017).
(Continued)

*Primary Examiner* — Duane N Taylor, Jr.
(74) *Attorney, Agent, or Firm* — Loza & Loza, LLP; Peter Zura (57) ABSTRACT

Technologies and techniques for operating of a touch-sensitive display device of a vehicle. A processor display generates content on the touch-sensitive display device, wherein the content includes assigned elements configured to function in a display mode and an operating mode, depending on a user's presence in at least one of a first
(Continued)

position and a second position of the vehicle. A sensing apparatus detects an approach by a user toward the touch-sensitive display device. The processor identifies that the user is in the second position relative to the display device, and, based on the identifying, changes an operating state of the display device to change at least one display mode element of the display content assigned to the second position from display mode to operating mode.

20 Claims, 4 Drawing Sheets (51) Int. Cl.
*B60H 1/00* (2006.01)
*B60K 37/06* (2006.01)
*G06F 3/041* (2006.01)
*B60N 2/02* (2006.01)
*B60N 2/56* (2006.01)
*G06F 3/0482* (2013.01)

(52) U.S. Cl.
CPC ...... *G06F 3/041* (2013.01); *B60K 2370/1438* (2019.05); *B60K 2370/164* (2019.05); *B60K 2370/166* (2019.05); *B60K 2370/52* (2019.05); *B60K 2370/73* (2019.05); *B60K 2370/736* (2019.05); *B60N 2/02* (2013.01); *B60N 2/56* (2013.01); *G06F 3/0482* (2013.01); *G06F 2203/04108* (2013.01); *G09G 2354/00* (2013.01); *G09G 2380/10* (2013.01)

(56) References Cited

U.S. PATENT DOCUMENTS

| | | | |
|---|---|---|---|
| 2011/0296340 A1 | 12/2011 | Nakagawa | |
| 2014/0168091 A1 | 6/2014 | Jones | |
| 2016/0167517 A1* | 6/2016 | Nishihashi | B60K 35/00 345/174 |

FOREIGN PATENT DOCUMENTS

| | | |
|---|---|---|
| DE | 102015103964 A1 | 9/2015 |
| EP | 1854678 A1 | 11/2007 |
| EP | 1961618 A2 | 8/2008 |
| EP | 1977926 A2 | 10/2008 |
| EP | 2444882 A1 | 4/2012 |
| EP | 2960099 A2 | 12/2015 |
| JP | 2008197934 A | 8/2008 |
| JP | 2010127784 A | 6/2010 |
| WO | 2014067803 A1 | 5/2014 |

OTHER PUBLICATIONS

PCT International Application No. 2017/EP2017/050354. Written Opinion (dated May 9, 2017).
PCT International Application No. 2017/EP2017/050354. Int'l Prelim. Report on Patentability (dated Aug. 21, 2018).

* cited by examiner

FIG. 4

ARRANGEMENT, MEANS OF LOCOMOTION AND METHOD FOR ASSISTING A USER IN THE OPERATION OF A TOUCH-SENSITIVE DISPLAY DEVICE

RELATED APPLICATIONS

The present application claims priority to International Pat. App. No. PCT/EP2017/051354, titled "Arrangement, Means of Locomotion and Method for Assisting a User in the Operation of a Touch-Sensitive Display Device," to Wengelnik et al, filed Feb. 15, 2016, the contents of which is incorporated by reference in its entirety herein

BACKGROUND

The present disclosure relates to an arrangement, a means of transportation and a method for supporting a user in the operation of a touch-sensitive display device. The present disclosure particularly relates to the highlighting of adjustable display elements as a function of a seat position.

The increase in the number of features in modern user end devices and means of transportation also results in menu-prompted user interfaces containing a growing plurality of display elements that can interfere with the comfortable use and the optical appearance of such interfaces. Accordingly, the prior art already proposes user interfaces that switch between a "display mode" and an "operating mode." When responding to a detected impending interaction by the user with the interface and seeking to present an optimized display that is appealing and tidy, the system modifies the screen content for more ergonomic and clearer operability.

US 2014/0168091 A1 discloses a system with a touch-sensitive screen that can present two different display contents simultaneously as a function of a viewing angle.

EP 1,961,618 A2 discloses a method for assigning the operation of features to a specific user. This means that operating a user interface is assigned to a specific user, whereby the display has a tidier appearance and/or operating display and driving can be executed more safely.

DE 10 2015 103 964 A1 discloses a user interface for a means of transportation that enables and/or disables operating complex features as a function of the position of the seat and the travelling speed to thereby reduce the incidence of potential distractions for a driver due to complex operating actions.

Based on the previously identified prior art, it is an object of the present disclosure to provide further support for users of a user interface.

SUMMARY

The object as identified above is achieved according to the invention with a method for supporting a user when said user operates a touch-sensitive display device. The user can be, for example, a driver or a passenger of a means of transportation. The display device can comprise a screen inside a dashboard of a means of transportation. The display device can also be embodied as a component of a wireless communications device (e.g., smartphone, tablet, and the like). In one embodiment, the display device can be implemented as a touchscreen. In a first step, using the display device, a display content is visualized that is visible from a first position and a second position. The display content can also be understood to mean "screen content." Accordingly, the display content can be visualized particularly from the first position as well as the second position. In other words, due to the display device, the display content that is visualized for an observer in the first position will always be the same as that for an observer in the second position. It is subsequently detected that the user approaches the display device. Said approach can be understood as a reduction of the distance (particularly, always greater than 0 cm) between the user and a surface of the display device. Said identification can be done, for example, by capacitative and/or optical and/or infrared-based means. The user is then identified as being away from the second position relative to the display device. For example, the user can be in the first position when executing the previously described approach. The user can be identified, for example by means of the same sensor that served for detecting the approach. In the alternative or in addition, it is possible to use a further sensor (in means of transportation, this can be, for example, a sensor that detects seat occupancy) for detecting the absence of the user from the second position. When responding to the approach or identifying the absence of the user relative to the second position, an operating state of the display device changes from a display mode to an operating mode, wherein at least one display element that is visualized of the display device and assigned to the second position relative to the display device does not undergo an optical change but remains in a display mode, even though, in principle, this display element is also envisioned as having a display mode and an operating mode. If the change from the display mode to the operating mode for the display element assigned to the second position does not constitute a support for a user who is away from the second position, the present invention can contribute to an advantageously calming and optically tidied-up appearance of the displayed content of the display device. Based on the present invention, the user can, moreover, experience the change from the display mode to the operating mode as an improved indicator for visualizing possible operating steps. This means that, particularly, while simultaneously driving, the present invention can help improve driving safety.

BRIEF DESCRIPTION OF THE DRAWINGS

Embodiments of the present disclosure will be described below in reference to the enclosed drawings. The drawings are as follows.

DETAILED DESCRIPTION

Under an illustrative embodiment, a first position can be predefined, for example, by a seat position within the means of transportation and/or by another seat that has a predefined position relative to the display device. Using seat positions facilitate an easy and robust sensory detection of the user position.

The display device can be fitted, for example, for the purpose of integrating the same in the dashboard of a means of transportation. In other words, the dashboard is an element that may be fixedly and permanently installed by the vehicle manufacturer or supplier of said dashboard. The display device can be embodied, for example, as a central information display (CID). Particularly when the seat positions of the means of transportation are used, the sensory detection of the presence of the user and the predefined spatial relation of said user relative to the display device are easily and safely established.

The approach under the present disclosure can be understood as the user's hand entering the space in front of the display device. In other words, according to the an illustrative embodiment, any touching of a touch-sensitive/sensory-sensitive surface of the display device is precluded in the context of said approach. This does not rule out, however, that a subsequent touching of the touch-sensitive surface of the display device can be envisioned for operating the user interface according to the present disclosure when in operating mode.

In an illustrative embodiment, the optical appearance of the display element does not change when the display mode changes to the operating mode, and can be assigned in such a manner, for example, that it influences a parameter of a heater, a climate-control feature, a seat adjustment, a sound adjustment, and the like. In an illustrative embodiment, it is particularly advantageous for those function calls to be adjustable that are significant for a user in the first position but immaterial for a user in the second position (and vice versa). For example, the functions may include, but are not limited to, a heater and/or seat heater and/or a climate-comfort seat feature (cooling air flow from openings in the seat cover) and/or a passenger-related climate-control zone (temperature, ventilation intensity, air flow emitter, local AUTO feature) and/or an armrest heater and/or features that are blocked for the driver while traveling, but not for the passenger (operation of long lists, spellers, complex setup, manual), and/or ambient lighting and/or a reading lamp and/or localized cabin lighting and/or power windows, which can be modified by the user who is actually seated in the related position.

An arrangement for implementing the above-captioned method is provided according to another illustrative embodiment. The arrangement can be a component of a means of transportation, a wireless communications end device (smartphone, tablet, and the like) or another user interface. It comprises a touch-sensitive display device (touchscreen), a proximity sensor means (e.g., capacitive, optical or infrared-based sensor means) and an analysis unit that can comprise a programmable processor (e.g., an electronic controller). The display device may be configured to visualize content that is visible from a first position and that is visible from a second position. The display device therein should be understood, particularly, as a display that is essentially independent of any viewing angle, which means it visualizes the same display content irrespective of the viewing angle of the respective observer. The proximity sensor means can detect any approaching action by the user toward the display device and identify the absence of the user relative to the second position. The analysis unit may be configured to change the operating state of the display device from a display mode to an operating mode, and wherein, as a function of the detected first position, at least one display element that is visualized on the display device will not be changed from the display mode to the operating mode if it represents a feature that has no relevance for a user in the second position. Accordingly, the arrangement implements the same features, combinations of features and any advantages resulting therefrom as the method according to the present disclosure are provided herein.

In some illustrative embodiments, a seat occupancy sensor can be coupled to the arrangement for determining the position of the user during operation. The coupling action can be achieved, for example, via a bus system (e.g., CAN, MOST, FlexRay, and the like) for the transmission of information. The seat occupancy sensor can comprise a capacitive sensor, an optical sensor and/or a radar sensor. The seat occupancy sensor may provide information as to the presence of the user in a seat that is monitored by the sensor. Correspondingly, in the case of a negative seat occupancy signal, at any rate, it can be ruled out that the user is located in the respective seat.

In another illustrative embodiment, a computer program product (e.g., a data storage) is provided where the instructions are stored that enable a programmable processor to execute the method steps according to the first-mentioned aspect according to the invention. The computer program product can be embodied as a CD, DVD, Blu-Ray Disc, flash storage, hard drive, RAM/ROM cache etc.

According to another illustrative embodiment, a signal sequence is disclosed that represents the instructions enabling a programmable processor to execute the method steps according to the aspects described above. This way, providing the instructions by means of information technology also falls within the scope of protection of the invention in case that the related storage means that are necessary for this purpose are outside of the scope of the enclosed claims.

According to another illustrative embodiment, there is provided a user end device, such as a mobile wireless communications device (e.g., smartphone, tablet, etc.) that includes the arrangement described herein. Due to the plurality of sensor means that are provided in user end devices of this class, the implementation of the arrangement according to the present disclosure is possible essentially without any additional hardware requirements.

According to another illustrative embodiment, there is provided a means of transportation (e.g., passenger car, van, truck, motorcycle, aircraft and/or marine vehicle) that comprises an arrangement according to the aspects described herein. The arrangement therein can be provided, in particular, for the driver of the vehicle and a passenger, and the communication with the vehicle and the technical equipment therein is executed also while steering the vehicle. Accordingly, the features, combinations of features and any advantages resulting therefrom visibly correspond to those as detailed in connection with the aspects of the invention mentioned first and second above according to the invention prompting us to refer the reader to the comments above to avoid repetitiveness.

Figure 1:
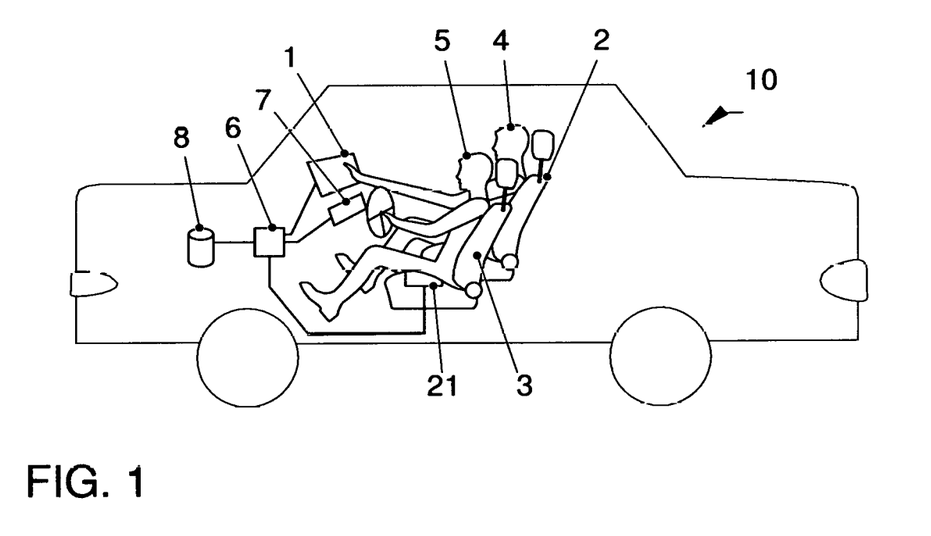
FIG. 1 shows a schematic overview of components of an embodiment of a vehicle according to the invention that is equipped with an embodiment of an arrangement according to an illustrative embodiment.

Turning to FIG. 1, the figure shows a passenger car 10 as a means of transportation that accommodates a driver 5 and a passenger 4 who have taken their seats as users in the driver's seat 3 and/or passenger seat 2 in the first and/or second position(s). The passenger 4 intends to operate the touchscreen 1 in the depicted arrangement, which is connected to an electronic controller 6 by information technology means. An infrared LED strip 7, which is also connected by information technology means to the controller 6 as an analysis unit, is disposed below the touchscreen 1 for purposes of detecting the approach by the passenger 4 relative to the touchscreen 1. A seat occupancy sensor 21 notifies the electronic controller 6 regarding the seat occupancy status of the driver's seat 3 and the passenger seat 2.

Figure 4:
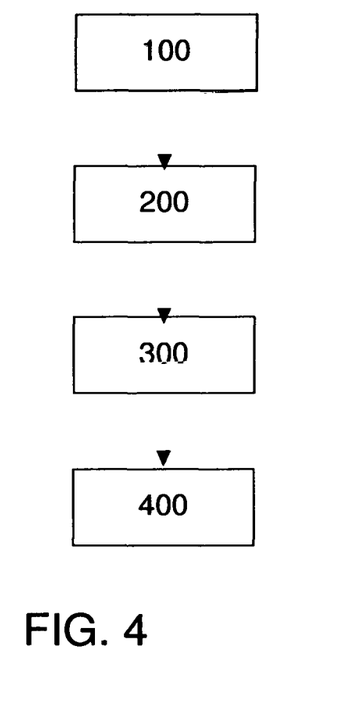
FIG. 4 shows a flow chart that illustrates the steps of an embodiment of a method according to an illustrative embodiment.

A data storage 8 is provided that keeps instructions for executing the method as explained in an exemplary manner in FIG. 4 readily available.

Figure 2:
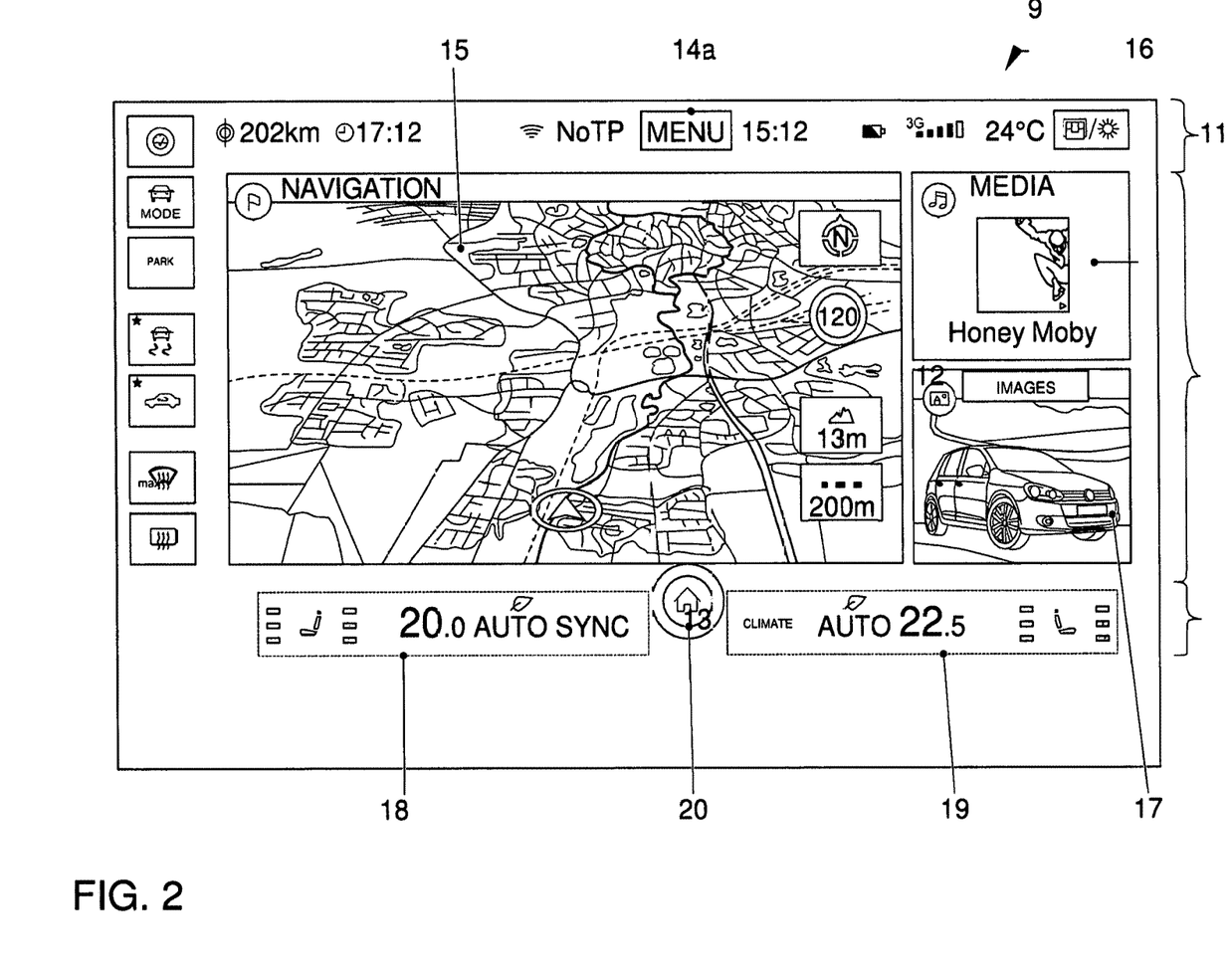
FIG. 2 shows a visualization of a display content of an arrangement according to an illustrative embodiment, seen in a display mode.

FIG. 2 is an exemplary visualization of a display content of the touchscreen 1 from FIG. 1 that is fully in a display mode. The display content 9 is structured into a status bar 11, a main display area 12 and a climate control area 13. In some illustrative embodiments, the aforementioned elements are arranged vertically relative to each other. In this example, the display mode is optimized for a tidy and optically appealing visualization. Aside from a button 14*a* labeled "menu," the status bar 11 may not contain any elements that are identified as elements provided for operational purposes. The main display area 12 includes a map visualization 15 for navigation support and tiles 16, 17 for applications associated with playing music and displaying images. To the left thereof, the climate control area includes a home button 20, buttons 18 for influencing parameters of a heating/climate-control feature on the driver position and, to the right of the home button 20, buttons 19 for influencing parameters of a heating/climate-control feature on the passenger side.

Figure 3:
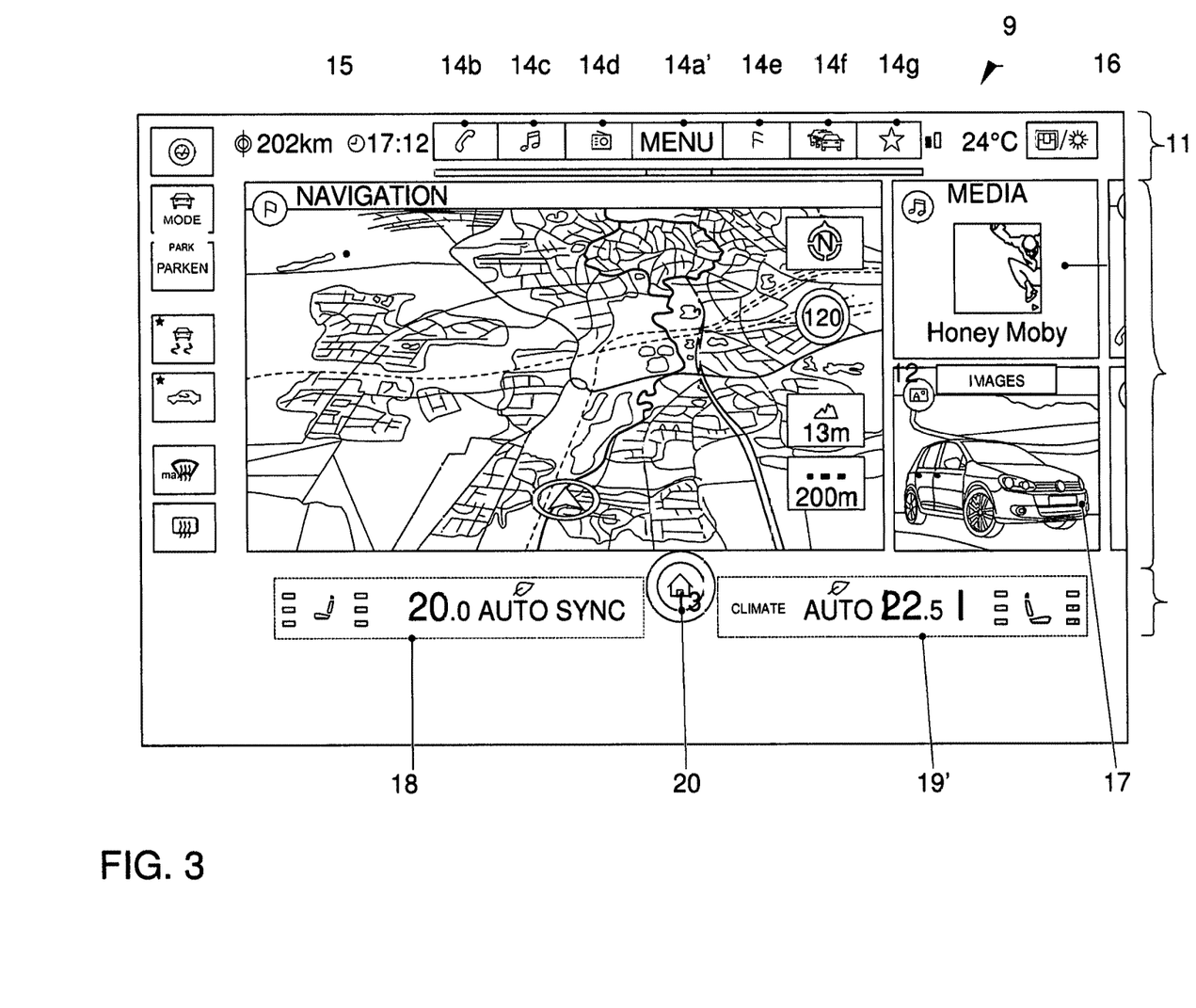
FIG. 3 shows a visualization of a display content of an arrangement according to an illustrative embodiment, seen in an operating mode.

FIG. 3 shows the display content from FIG. 2 after a user has approached the touchscreen 1 seen in FIG. 1 from the passenger position, where, upon responding, individual buttons 14*a*', 19' are visualized as optically changed. Button 14*a*' includes a corona and an underline. In this example, the button may be furthermore surrounded by buttons 14*b* to 14*g*, which are not present in FIG. 2 and by which the user can directly access further features when he or she touches the buttons 14*b* to 14*g*. The buttons 19' are visualized at least in part optically changed relative to the buttons 19 in FIG. 2. Vertical bars border the set temperature display, and the illustration of the passenger seat is visualized as enlarged. The buttons 18 for the corresponding heating/climate-control feature on the driver's side have notably remained optically unchanged. The user that causes the approach is therefore not tempted to change parameters of the heating/climate-control feature on the driver's side. The optically unchanged visualization of the buttons that impact functional content of a position away from the user position alone can result in the fact that parameter adjustments by the passenger that are undesirable to the driver of the means of transportation are disregarded. In addition, according to the invention, it is possible to envision that the buttons that have not changed from the display mode to the operating mode cannot be operated and/or that said buttons will not enable the adjusting of any parameters until they are changed to the operating mode, whereby the authorized user accesses the same.

FIG. 4 shows a flow chart that illustrates the steps of an embodiment of the method according to the invention in support of the user, when the user operates a touchscreen display device. Step 100 displays the display content that is visible from a first position and a second position using the display device. In step 200, an approach by the user toward the display device is detected. In step 300, it is identified that the user is located away from the second position, namely that he is located in the first position, relative to the display device. The order of the steps 200 and 300 can be reversed in some illustrative embodiments. In the alternative, the steps 200 and 300 can be executed simultaneously. Finally, in step 400, an operating state of the display device is changed from a visualization mode to an operating mode, and wherein, as a function of the detected first position, at least one display element of the display content that is visualized on the display device and assigned to the second position relative to the display device, for which a display mode and an operating mode are envisioned, remains in the display mode. In other words, only such display elements change from the display mode to the operating mode whose assigned features are envisioned to be accessed via the first position.

Even though the aspects according to the invention and the advantageous embodiments of the invention have been described in detail on the basis of and in connection with the enclosed figures in the drawings, a person skilled in the art will conceive of modifications and combinations of features of the represented embodiments without exceeding the scope of the invention whose range of protection is specified by the enclosed claims.

LIST OF REFERENCE SIGNS

1 Touchscreen
2 Passenger seat
3 Driver's seat
4 Passenger
5 Driver
6 Electronic controller
7 Infrared LED strip
8 Data storage
9 Display content
10 Passenger car
11 Status bar
12 Main display area
13 Climate-control area
14*a*, 14*a*', 14*b*-14*g* Buttons
15 Map visualization
16, 17 Tiles
18, 19, 19' Buttons for climate control operation
20 Home button
21 Seat occupancy sensor
100-400 Method steps

The invention claimed is:

1. A processor-based method for operating of a touch-sensitive display device of a vehicle, comprising the steps of:
   generating, via a processor, display content on the touch-sensitive display device, wherein the content comprises assigned elements configured to function in a display mode and an operating mode, depending on a user's presence in at least one of a first position and a second position of the vehicle;
   detecting via a sensing apparatus, an approach by a user toward the touch-sensitive display device;
   identifying, via the processor, that the user is in the second position relative to the display device, and, based on the identifying,
   changing, via the processor, an operating state of the display device to change at least one display mode element of the display content assigned to the second position from display mode to operating mode;
   maintaining, via the processor, an operating state of the display device to maintain one other display mode element of the display content in display mode when changing to operating mode, such that the one other display mode element is non-operational from the second position.

2. The processor-based method of claim 1, further comprising maintaining, via the processor, the assigned elements to the first position after the at least one display mode element of the display content assigned to the second position is changed from display mode to operating mode.

3. The processor-based method of claim 1, wherein the first position and second position comprise seat positions in the vehicle.

4. The processor-based method of claim 3, wherein the first position is a driver seat position and the second position is a passenger seat position.

5. The processor-based method of claim 1, wherein the touch-sensitive display device is configured for being integrated in a dashboard of the vehicle.

6. The processor-based method of claim 1, wherein detecting via a sensing apparatus, an approach by a user toward the touch-sensitive display device comprises detecting a body part of the user entering a space that is not directly adjacent to the display device.

7. The processor-based method of claim 1, wherein the assigned elements, when configured in an operating mode, are operative to affect functions for at least one of:
a heater,
a climate-control feature,
a seat adjustment,
a sound adjustment,
a passenger-related climate-control zone,
an armrest heater,
features that are blocked for the second position, but not for the first position, while traveling,
ambient lighting,
a reading light,
localized cabin lighting, and/or
power windows.

8. A vehicle system, comprising:
a touch-sensitive display device;
a proximity sensor, configured to detect an approach by a user toward the touch-sensitive display device; and
an analysis unit, wherein the analysis unit comprises a processor, and wherein the analysis unit is configured to
generate display content on the touch-sensitive display device, wherein the content comprises assigned elements configured to function in a display mode and an operating mode, depending on a user's presence in at least one of a first position and a second position of the vehicle, and
identify that the user is in the second position relative to the display device, and, based on the identifying, change an operating state of the display device to change at least one display mode element of the display content assigned to the second position from display mode to operating mode; and
maintain an operating state of the display device to maintain one other display mode element of the display content in display mode when changing to operating mode, such that the one other display mode element is non-operational from the second position.

9. The system of claim 8, further comprising one or more seat occupancy sensors to detect the first position and second position as seat positions in the vehicle.

10. The system of claim 9, wherein the first position is a driver seat position and the second position is a passenger seat position.

11. The system of claim 9, wherein the one or more seat sensors comprise at least one of a capacitive sensor, an optical sensor, and/or a radar sensor.

12. The system of claim 8, wherein the touch-sensitive display device is configured to be integrated in a dashboard of the vehicle.

13. The system of claim 8, wherein the proximity sensor is configured to detect an approach by a user toward the touch-sensitive display device comprises detecting a body part of the user entering a space that is not directly adjacent to the display device.

14. The system of claim 8, wherein the assigned elements, when configured in an operating mode, are operative to affect functions for at least one of:
a heater,
a climate-control feature,
a seat adjustment,
a sound adjustment,
a passenger-related climate-control zone,
an armrest heater,
features that are blocked for the second position, but not for the first position, while traveling,
ambient lighting,
a reading light,
localized cabin lighting, and/or
power windows.

15. One or more non-transitory computer readable media containing computer executable instructions for performing a method comprising:
generating display content on the touch-sensitive display device, wherein the content comprises assigned elements configured to function in a display mode and an operating mode, depending on a user's presence in at least one of a first position and a second position of the vehicle;
detecting an approach by a user toward the touch-sensitive display device;
identifying that the user is in the second position relative to the display device, and, based on the identifying;
changing an operating state of the display device to change at least one display mode element of the display content assigned to the second position from display mode to operating mode; and
maintaining an operating state of the display device to maintain one other display mode element of the display content in display mode when changing to operating mode, such that the one other display mode element is non-operational from the second position.

16. The one or more non-transitory computer readable media of claim 15, further comprising maintaining the assigned elements to the first position after the at least one display mode element of the display content assigned to the second position is changed from display mode to operating mode.

17. The one or more non-transitory computer readable media of claim 15, wherein the first position and second position comprise seat positions in the vehicle.

18. The one or more non-transitory computer readable media of claim 17 wherein the first position is a driver seat position and the second position is a passenger seat position.

19. The one or more non-transitory computer readable media of claim 15, wherein detecting via a sensing apparatus, an approach by a user toward the touch-sensitive display device comprises detecting a body part of the user entering a space that is not directly adjacent to the display device.

20. The one or more non-transitory computer readable media of claim 15, wherein the assigned elements, when configured in an operating mode, are operative to affect functions for at least one of:
a heater,
a climate-control feature,
a seat adjustment,
a sound adjustment, a passenger-related climate-control zone,
an armrest heater,
features that are blocked for the second position, but not for the first position, while traveling,
ambient lighting,
a reading light,
localized cabin lighting, and/or
power windows.

\* \* \* \* \*